United States Patent [19]

Hayes

[11] Patent Number: 5,232,965
[45] Date of Patent: Aug. 3, 1993

[54] STABILIZED POLYACETAL COMPOSITIONS

[75] Inventor: Richard A. Hayes, Parkersburg, W. Va.

[73] Assignee: E. I. Du Pont de Nemours and Company, Wilmington, Del.

[21] Appl. No.: 673,349

[22] Filed: Mar. 22, 1991

[51] Int. Cl.$^5$ .................................................. C08K 5/34
[52] U.S. Cl. .................................... 524/100; 524/102; 524/91; 524/208; 524/241; 524/359
[58] Field of Search .................... 524/102, 100, 500

[56] References Cited

U.S. PATENT DOCUMENTS

| | | | |
|---|---|---|---|
| 3,992,390 | 11/1976 | Holt et al. | 260/293.82 |
| 4,110,305 | 8/1978 | Holt et al. | 260/45.8 N |
| 4,210,576 | 7/1980 | Di Battista et al. | 260/45.8 NE |
| 4,331,586 | 5/1982 | Hardy | 525/186 |
| 4,361,659 | 11/1982 | Di Battista et al. | 528/289 |
| 4,446,263 | 5/1984 | Bryant | 524/100 |
| 4,477,665 | 10/1984 | Lai et al. | 544/384 |
| 4,684,679 | 8/1987 | Kubota et al. | 524/91 |
| 4,717,745 | 1/1988 | Ishii et al. | 524/91 |
| 4,730,015 | 3/1988 | Ikenaga et al. | 524/91 |
| 4,766,168 | 8/1988 | West | 524/377 |
| 4,780,495 | 10/1988 | Lai et al. | 524/100 |
| 4,814,397 | 3/1989 | Novak | 525/154 |
| 4,863,981 | 9/1989 | Gugumus | 524/97 |

FOREIGN PATENT DOCUMENTS

| | | |
|---|---|---|
| 172691A | 2/1985 | European Pat. Off. |
| 0151042 | 8/1985 | European Pat. Off. |
| 300573A | 7/1988 | European Pat. Off. |
| 0351235 | 1/1990 | European Pat. Off. |
| 356167 | 2/1990 | European Pat. Off. |
| 0388809 | 9/1990 | European Pat. Off. |
| 3148768 | of 1980 | Fed. Rep. of Germany. |
| 7316984 | 5/1973 | Japan. |
| 60-195155 | of 1985 | Japan. |
| 63-193950 | 8/1988 | Japan. |
| 63-273657 | 11/1988 | Japan. |
| 712422A | 1/1980 | U.S.S.R. |

OTHER PUBLICATIONS

RD 25433 –Research Disclosure, Jun. 1985.

*Primary Examiner*—Kriellion S. Morgan

[57] ABSTRACT

Incorporation of at least one hindered amine light stabilizer ("HALS") compound having a hindered phenol group and a piperidine ring or oxo-piperazinyl ring, provided that each such ring has a hindered amine, at the $N^4$ position in the ring, that is of tertiary functionality, into polyacetal homopolymer compositions improves the UV stability, and does not significantly degrade the melt processing thermal stability, of said composition.

Incorporation of (a) a HALS compound having an s-triazine group, along with a piperidine ring or an oxo-piperazinyl ring, (provided each such ring has a hindered amine at the $N^4$ position in the ring), and (b) a HALS as described in the preceding paragraph into polyacetal polymer compositions improves the UV stability, and does not significantly degrade the thermal stability of said composition.

The composition of the present invention are useful in polyacetal applications where enhanced UV stability is desired.

9 Claims, No Drawings

STABILIZED POLYACETAL COMPOSITIONS

BACKGROUND OF THE INVENTION

1. Technical Field

This invention relates to polyacetal compositions containing certain hindered amine light stabilizers ("HALS").

Polyacetal (also commonly referred to as polyoxymethylene) compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxy terminated or can be end-capped by esterification or etherification. The proportion of the comonomers can be up to 20 percent weight.

Compositions based on polyacetals of relatively high molecular weight (i.e., 10,000 to 100,000) are useful in preparing semi-finished and finished articles by any of the techniques commonly used with thermoplastic materials, e.g., compression molding, injection molding, extrusion, blow molding, rotational molding, melt spinning, stamping, thermoforming and the like. Finished articles made from such compositions possess desirable physical properties, including high stiffness, strength, low coefficient of friction, and good solvent resistance.

In some applications, polyacetal compositions are exposed to ultraviolet ("UV") light for long periods of time. It is desired that under such circumstances, the polyacetal composition remain relatively stable. To impart or improve UV light stability to a polyacetal composition, HALS may be added to the polyacetal compositions. However, it is not uncommon that the addition of a HALS to a polyacetal composition can adversely affect other properties of the polyacetal composition, especially its melt processing thermal stability.

It has been found, in the present invention, that the inclusion of certain HALS into a polyacetal composition results in a polyacetal composition having good stability upon exposure to UV light, as measured by weight loss upon exposure to UV light for a set period of time. Further, it has been found that the inclusion of these certain HALS into a polyacetal composition does not significantly adversely affect other properties (in particular, melt processing thermal stability (as measured by a thermally evolved formaldehyde test)), of the polyacetal composition.

The present invention more specifically relates to polyacetal homopolymer compositions containing at least one HALS that contains a hindered phenol group and that further contains a piperidine ring or an oxo-piperazinyl ring. Both the piperidine ring and the oxo-piperazinyl ring contain a hindered amine, at the $N^4$ position in the ring, that is of tertiary functionality. These types of HALS are referred to herein as either "Type I HALS" or "Type I (component b) HALS".

The present invention also relates to polyacetal compositions containing at least one HALS as described in the preceding paragraph (i.e., Type I HALS) and additionally, at least one HALS that has an s-triazine ring and a piperidine ring or an oxo-piperazinyl ring. Both the piperidine ring and the oxo-piperazinyl ring contain a hindered amine, at the $N^4$ position in the ring, which may be of secondary or tertiary functionality. This latter type of HALS is referred to herein as either "Type II HALS" or "Type II (component c) HALS".

The compositions of the present invention are useful wherever it is desired to use a polyacetal composition having enhanced UV and thermal stability, both during and after melt processing. Articles prepared from the compositions of the present invention can be used, for example, in automotive or irrigation applications.

2. Background Art

U.S. Pat. No. 4,863,981 discloses a polymer stabilizer mixture containing (a) a polyalkyl piperidine hindered amine light stabilizer component wherein the hindered amine in the piperidine ring is of tertiary functionality and (b) a polyalkylpiperidine hindered amine light stabilizer component which incorporates an s-triazine residue. The component (a) HALS does not contain a hindered phenol group.

U.S. Pat. No. 4,446,263 discloses a polyacetal copolymer stabilizer mixture of (a) 1,6-hexamethylene bis(3,5-di-tert-butyl)-4-hydroxyhydrocinnamate, (b) 2,4,6-triamino-sym-triazine, (c) bis (1,2,2,6,6-pentamethyl-4-piperidinyl) [3,5-bis(1,1-dimethylethyl-4-hydroxyphenyl) methyl] butylpropanedioate (sold commercially as Tinuvin® 144/Ciba Geigy), and (d) 2-hydroxy-4-n-octoxy-benzophenone (sold commercially as Cyasorb® UV 531). In the stabilizer mixture, component (a) serves as an antioxidant, component (b) serves as an acid scavenger, component (c) serves as a free radical scavenger, and component (d) serves as an acid scavenger. The stabilizer mixture is taught to be useful specifically in polyacetal copolymer compositions. There is no teaching that said stabilizer mixture would be useful in polyacetal homopolymer compositions. In fact, as is shown in the Examples below, the component (b) of said stabilizer package severely degrades the melt processing thermal stability of polyacetal homopolymer compositions and as such, would not be acceptable for use therein.

SUMMARY OF THE INVENTION

The present invention relates to compositions containing (a) 95.00 to 99.95 weight percent of a polyacetal homopolymer and (b) 0.05 to 5.00 weight percent of at least one Type I HALS selected from the group consisting of HALS (b)(1) and HALS (b)(2), which are as follows:

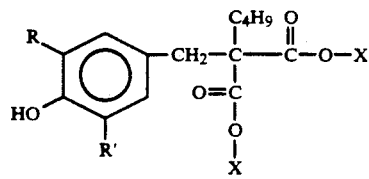

wherein R is $C_1$–$C_6$ alkyl (linear or branched), R' is H or $C_1$–$C_6$ alkyl (linear or branched), and X is selected from (b)(1)(a) and (b)(1)(b) as follows:

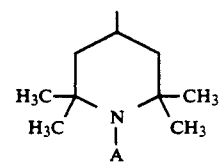

(b)(1)(a)

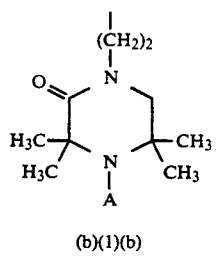

(b)(1)(b)

wherein A→$C_1$-$C_6$ alkyl preferably $C_1$-$C_3$ alkyl, and most preferably $CH_3$;

HALS (b)(2)

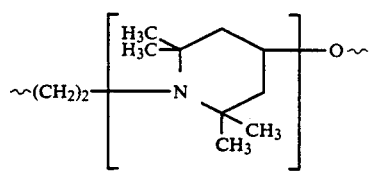

(b)(2)(a)

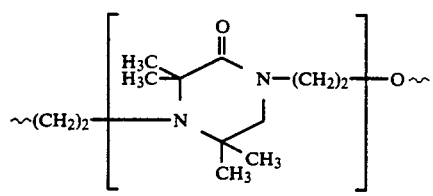

(b)(2)(b)

The present invention also relates to compositions containing (a) 95.00 to 99.90 weight percent of a polyacetal, (b) 0.05 to 2.50 weight percent of at least one Type I HALS selected from HALS (b)(1) and HALS (b)(2), as given above, and (c) 0.05 to 2.50 weight percent of at least one Type II HALS selected from HALS (c)(1), HALS (c)(2), and HALS (c),(3), which are as follows:

HALS (c)(1)

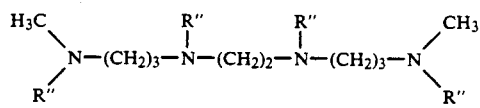

wherein R″ is

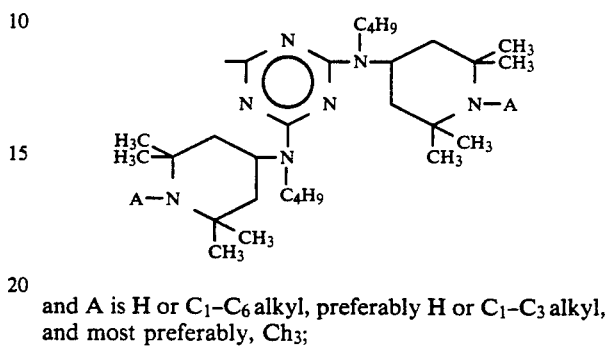

and A is H or $C_1$-$C_6$ alkyl, preferably H or $C_1$-$C_3$ alkyl, and most preferably, $Ch_3$;

HALS (c)(2)

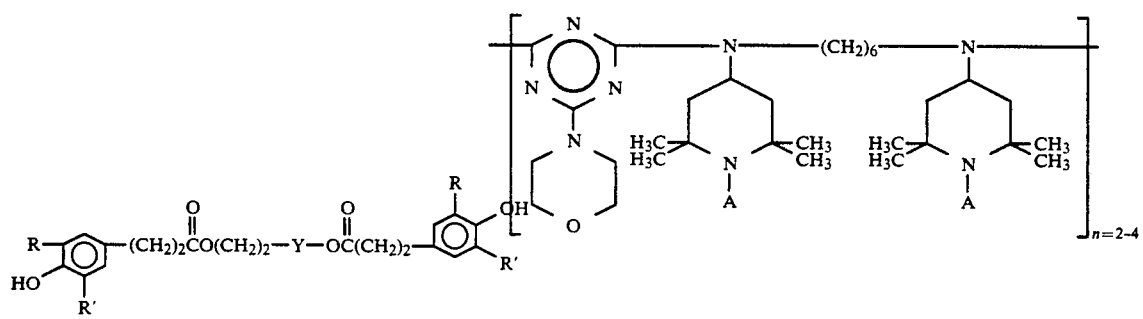

wherein A is H or $C_1$-$C_6$ alkyl, preferably H or $C_1$-$C_3$ alkyl, and most preferably $CH_3$;

HALS (c)(3)

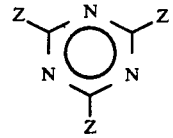

wherein Z is

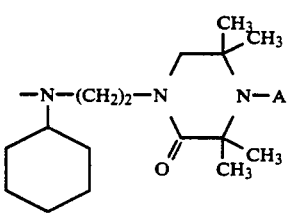

and A is H or $C_1$-$C_6$ alkyl, preferably H or $C_1$-$C_3$ alkyl, and most preferably $CH_3$.

The compositions of the present invention possess good thermal and UV light stability. Such compositions are useful in applications where stability to UV light is desired.

DETAILED DESCRIPTION OF THE INVENTION

A. The Compositions

This invention relates to polyacetal compositions containing certain particular HALS. More specifically, it relates to polyacetal homopolymer compositions containing at least one Type I (component b) HALS. It also relates to polyacetal compositions containing at least one Type I (component b) HALS and at least one Type II (component c) HALS.

Type I (component b) HALS are HALS containing a hindered phenol group. Type I (component b) HALS additionally contain either a piperidine ring or an oxopiperazinyl ring. Both types of rings contain a hindered amine, at the $N^4$ position in the ring, that is of tertiary functionality.

Type II (component c) HALS are HALS containing an s-triazine ring. Additionally, Type II (component c) HALS contain either a piperidine ring or an oxopiperazinyl ring. Both the piperidine ring and the oxopiperazinyl ring contain a hindered amine at the $N^4$ position in the ring. The hindered amine can be of secondary or tertiary functionality, preferably tertiary functionality.

The compositions of the present invention consist essentially of (a) 95.00 to 99.95 weight percent of a polyacetal homopolymer and (b) 0.05 to 5.00 weight percent of a Type I HALS selected from HALS (b)(1) and HALS (b)(2), as described above. Preferably, these compositions consist essentially of 96.00 to 99.95 weight percent component (a) and 0.05 to 4.00 weight percent component (b). Most preferably, these compositions consist essentially of 99.00 to 99.95 weight percent component (a) and 0.05 to 1.00 weight percent component (b). The above weight percents are based upon the weight of components (a) and (b) only.

In yet another embodiment, the compositions of the present invention consist essentially of (a) 95.00 to 99.90 weight percent of a polyacetal, (b) 0.05 to 2.50 weight percent of a Type I HALS selected from HALS (b)(1) and HALS (b)(2), as described above, and (c) 0.05 to 2.50 of a Type II HALS selected from HALS (c)(1), HALS (c)(2), and HALS (c)(3), as described above. Preferably, these compositions consist essentially of 96.00 to 99.90 weight percent component (a), 0.05 to 2.00 weight percent component (b), and 0.05 to 2.00 weight percent component (c). Most preferably, these compositions consist essentially of 97.00 to 99.90 weight percent component (a), 0.05 to 1.50 weight percent component (b), and 0.05 to 1.50 weight percent component (c). The weight percents given in this paragraph are based upon the total weight of components (a), (b), and (c) only.

1. Component (a) - Polyacetal

The term "polyacetal" refers to polyacetal homopolymer, polyacetal copolymer, and mixtures thereof.

The term "polyacetal homopolymer" includes homopolymers of formaldehyde or of cyclic oligomers of formaldehyde, the terminal groups of which are end-capped by esterification or etherification. Generally, polyacetal homopolymer is preferred over polyacetal copolymer because of its greater stiffness. Preferred polyacetal homopolymers include those whose terminal hydroxyl groups have been end-capped by a chemical reaction to form ester of their groups, preferably acetate or methoxy groups, respectively.

The term "polyacetal copolymer" includes copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. Polyacetal copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer is generally not more than 20 weight percent, preferably not more than 15 weight percent, and most preferably about 2 weight percent. The most preferred comonomer is ethylene oxide.

The polyacetal (whether it be a homopolymer or a copolymer) used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be sued, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

Polyacetals are commercially available or can be prepared by readily available techniques.

2. Component (b) - Type I HALS

The component (b) Type I HALS has been generally described above. Preferably, the component (b) HALS is selected from HALS (b)(1) and HALS (b)(2), given above. HALS (b)(1) is preferred over HALS (b)(2).

The preferred embodiment of HALS (b)(1) is where R is $C(CH3)3$, X is structure (b)(1)(a), and A is $C_1$-$C_3$ alkyl. The most preferred embodiment of HALS (b)(1) is where $R=R'=C(CH3)3$, X is structure (b)(1)(a), and A is a methyl group.

The preferred embodiment of HALS (b)(2) is where Y is structure (b)(2)(a) and R is $C(CH3)3$. The most preferred embodiment of HALS (b)(2) is where Y is structure (b)(2)(a) and $R=R'=C(CH3)3$.

Type I component (b) HALS are commercially available or can be prepared by techniques readily available to those skilled in the art.

3. Component (c) - Type II HALS

The component (c) Type II HALS has been generally described above. Preferably, the component (c) HALS is selected from HALS (c)(1), HALS (c)(2), and HALS (c)(3), given above.

The preferred embodiment of HALS (c)(1), HALS (c)(2), and HALS (c)(3), is where A is H $C_1$-$C_3$ alkyl, and most preferably, it is where A is a methyl group. For HALS (c)(2), n is 2-100, preferably 2-20, and more preferably 2-4.

Type II (component c) HALS are commercially available or can be prepared by techniques readily available to those skilled in the art.

4. Additional Ingredients

It should be understood that the compositions of the present invention can include, in addition to the components (a), (b), and (c) described above, other ingredients, modifiers and additives as are generally used in polyacetal compositions, including thermal stabilizers, antioxidants, pigments, colorants, toughening agents, reinforcing agents, UV stabilizers, nucleating agents, lubricants, glass fibers, and fillers. It should also be understood that some pigments and colorants can, themselves, adversely affect the stability of polyacetal compositions.

Thermal stabilizers of particular interest include polyamide stabilizers, especially nylon terpolymers, hydroxy-containing polymers such as those described in U.S. Pat. Nos. 4,766,168 and 4,814,397, and non-meltable nitrogen-containing or hydroxy-containing polymers, along with non-meltable naturally occurring polymers, such as described in European Patent Publication 0388809. Generally, the total amount of thermal stabilizer added to the composition is between 0.05 to 5.00, preferably 0.05 to 2.50, and most preferably 0.05 to 1.50 weight percent, based upon the weight of the polyacetal and the thermal stabilizer.

It has also been found that the inclusion of a mixed antioxidant system into the compositions of the present invention is advantageous for thermal stability purposes. Preferably, the mixed antioxidant system is comprised of an N,N-hexamethylene bis(3,5-di-tert-butyl-4-hydroxy-hydrocinnamide) antioxidant and at least one other hindered phenol type antioxidant, such as triethyleneglycol bis(3-(3'-tert-butyl-4'-hydroxy-5'-methylphenyl)-proprionate or tetrakis (methylene (3,5-di-tert-butyl-4-hydroxy-hydrocinnamate)) methane. Other hindered phenol type antioxidants are known in the art. Generally, the weight percent of total antioxidant added to the polyacetal composition is less than 2.00, preferably less than 1.??, and most preferably less than 0.50 weight percent, based upon the weight of the polyacetal, thermal stabilizer (if any) and the antioxidant.

Further, it has been found that a UV absorber, in combination with the HALS described herein will impart a UV resistance to the polyacetal composition that is superior to the UV resistance of a polyacetal composition containing an equivalent amount of either the UV absorber or said HALS. As such, for even further improved UV stability, it may be advantageous to incorporate into the compositions of the present invention at least one UV absorber. UV absorbers are known and include benzotriazoles, such as 2-(3',5'-bis(1-methyl-1-phenyl ethyl)-2'-hydroxyphenol) benzotriazole; benzophenones, such as 2-hydroxy-4-n-octoxybenzophenone; oxanilides (oxalic acid diamines), such as 2-ethoxy-5-tert-butyl-2,- ethyloxanilide and its mixture with 2-ethoxy-2'-ethyl-5,4'-di-tert-butyloxanilide; cyanoacrylates and mixtures of the above types of UV absorbers. Generally, the total weight percent of UV absorber added to the composition is between 0.05 to 5.00, preferably between 0.05 to 4.00 weight percent, and most preferably between 0.05 to 1.00 weight percent, based upon the weight of the polyacetal, thermal stabilizer (if any), antioxidant (if any), and the UV absorber only.

B. Preparation of the Compositions

The compositions of the present invention can be prepared by mixing the components described herein at a temperature above the melting point of the polyacetal polymer component of the compositions using any intensive mixing device conventionally used in preparing polyacetal compositions, such as rubber mills, internal mixers such as "Banbury" and "Brabender" mixers, single or multiblade internal mixers with a cavity heated externally or by friction, "ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing, such as valves, gates or screws designed for this purpose. Extruders are preferred. Of course, such mixing should be conducted at a temperature below which significant degradation of the polyacetal component of the composition will occur. Generally, polyacetal compositions are melt processed between 170° C. to 280° C., preferably between 185° C. to 240° C., and most preferably 195° C. to 225° C.

Shaped articles can be made from the compositions of the present invention using any of several common methods, including compression molding, injection molding, extrusion, blow molding, rotational molding, melt spinning, and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°–270° C., preferably 185°–240° C., most preferably 200°–230° C. When injection molding the compositions of the present invention, it is preferred that the mold be as cold as possible consistent with the intricacy of the shape being produced. Generally, the mold temperature will be 10°–120° C., preferably 10°–10° C., and most preferably about 50°–90° C.

EXAMPLES

The following are the results of tests conducted with polyacetal compositions to determine the effectiveness of the particular HALS of the present invention. Also provided are test results on polyacetal compositions containing similar types of HALS that are not within the scope of the present invention. All temperatures are in degrees Celsius unless otherwise specified. Measurements have been rounded where appropriate. Unless specified otherwise, weight percents are based upon the weight of the total composition.

Unless specified otherwise, the compositions tested in the Examples below each contained 0.50 weight percent of a polyethyleneglycol having an average molecular weight of 8000, a thermal stabilizer system of 0.75 weight percent of an ethylene-vinyl alcohol copolymer thermal stabilizer (prepared as in U.S. Pat. No. 4,766,168) and 0.25 weight percent of a 33/23/43 terpolymer of nylon 66, nylon 610, and nylon 6, respectively, and an antioxidant system of 0.10 weight percent of triethylene glycol bis(3-3'-tert-butyl-4'-hydroxy-5'- methylphenyl) proprionate (Irganox® 245, Ciba Geigy) and 0.05 weight percent of N,N'-hexamethylene bis(3,5-di-tert-butyl-4-hydroxyhydrocinnamide (Irganox® 1098, Ciba Geigy).

Unless otherwise specified, the polyacetal used in the Examples below was an acetate end-capped polyacetal homopolymer having a number average molecular weight of about 40,000.

The compositions of the Examples were tested to determine thermal and UV stability.

The thermal stability of the compositions tested in the Examples below was determined using a Thermally Evolved Formaldehyde ("TEF") test procedure. A weighed sample of the polyacetal composition to be tested was placed in a tube and the tube was fitted with a cap for introduction of nitrogen to the test sample for removal of any evolved gases from the apparatus while maintaining the sample in an oxygen free environment. The tube that contained the sample was heated at 259° C. in a silicone oil bath. The nitrogen and any evolved gases transported thereby were bubbled through 75 ml of a 40 g/liter sodium sulfite in water solution. Any evolved formaldehyde reacted with the sodium sulfite to liberate sodium hydroxide. The sodium hydroxide was continuously neutralized with standard 0.1 N HCl. The results were obtained as a chart of ml of titer versus test time. The percent evolved formaldehyde was calculated by the formula $$(V)(N) \frac{0.03 \times 100}{SW}$$

where
V = the volume of titer in milliliters,
N = the normality of the titer, and
SW = the sample weight in grams.
The factor "0.03" is the milliequivalent weight of formaldehyde in g/milliequivalent. Thermally evolved formaldehyde results are conveniently reported as the amount of time, in minutes, required until 3.0 Wt. % formaldehyde had evolved. The results, in minutes, are reported in the tables, below under "Time to 3.0 Wt. % $CH_2O$ Loss at 259° C.".

The UV stability the compositions tested in the Examples below was determined through exposure to UV light, as described below. The compositions were tested to determine weight loss after UV exposure. Samples for the weight loss after UV exposure test were molded plaques having dimensions of 5 cm×8.1 cm×4 mm. The molded plaques weighed between 21 to 23 grams and the surface finish of said plaques was a high gloss surface. The high gloss side of the plaque was exposed to a UV light source at a prescribed amount (i.e., 600, 1250, or 2000 kJ/m², as specified in the Tables, below). All samples were subjected to UV exposure under the same conditions. Samples were weighed prior to testing. The samples were all subjected to accelerated UV exposure in an Atlas Ci65 Xenon Arc Weatherometer, operated as per SAE J1885 (Automotive Interior Conditions), with a quartz inner filter and a borosilicate outer filter. Pertinent details of the SAE J1885 method appear directly below as follows:

|  | Light Cycle | Dark Cycle |
|---|---|---|
| Irradiance (Watts/m²) | 0.55 | — |

|  | Light Cycle | Dark Cycle |
|---|---|---|
| Black Panel Temp. (°C.) | 89.0 | 38.0 |
| Relative Humidity (%) | 50.0 | 100.0 |
| Cycle Time (hours) | 3.8 | 1.0 |

Weight loss after UV exposure at the prescribed amount detailed in the Tables, below, was determined by weighing the sample after exposure to UV light at the prescribed amount and then calculating percent weight loss by the following formula: (((unexposed sample weight)-(exposed sample weight))/(unexposed sample weight))×100%. Weight loss is a standard test for studying polyacetal UV degradation.

Unless specified otherwise, the compositions tested in the Examples below were prepared in the manner as follows: the components listed for each composition were mixed together and melt compounded on a 2.5-inch Sterling single screw extruder with barrel temperature settings of 150° C. to 200° C., die temperature settings of 210° C., and screw speeds of 75 rpms. The temperature of the melt as it exited the die ranged from 220° C. to 230° C.

The Examples given below are separated into two sections. Section I relates to compositions containing polyacetal homopolymer and HALS Type I, along with comparative examples pertaining thereto. Section II relates to compositions containing polyacetal, HALS Type I, and HALS Type II, along with comparative examples pertaining thereto.

I. EXAMPLES 1-14.

Compositions Containing Component (a) Polyacetal Homopolymer and Component (b) Type I HALS I(a). HALS Used in Examples 1-14 and C1-C27

TYPE I HALS

"HALS IA" was a HALS (b)(1) wherein R=R'=C(CH₃)₃, X=structure (b)(1)(a), and A=methyl. The structure of HALS IA was as follows:

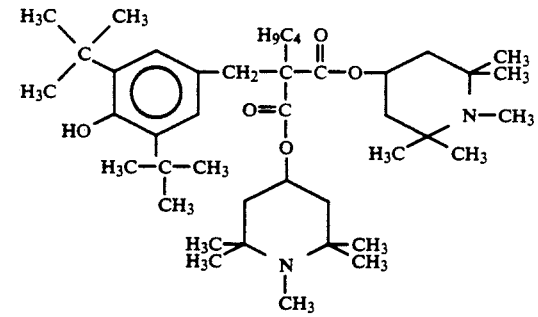

The chemical name for HALS IA is bis(1,2,3,6,6-pentamethyl-4-piperdinyl) [3,5-bis (1,1-dimethyl ethyl 4-hydroxyphenyl) methyl] butyl propanedioate. HALS IA is sold commercially as Tinuvin® 144 (Ciba Geigy).

CONTROL HALS

"HALS Control 1" was a HALS having the chemical name poly-((6-((4-piperidone)-imino)-s-triazine-2,4-diyl) (2-(2,2,6,6-tetramethylpiperidinyl)-imino-hexamethylene-(4-(2,2,6,6-tetramethylpiperidinyl)-imino)). HALS Control 1 had the following structure:

HALS (c)(2)

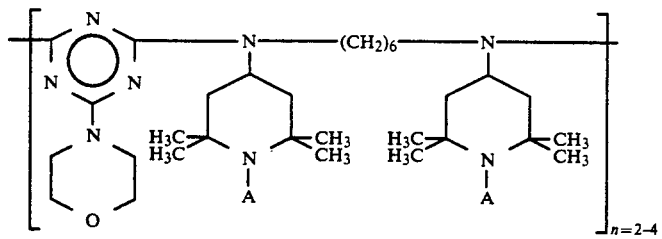

HALS Control 1 was not a Type I HALS because the hindered amine at the $N^4$ position in the piperidine ring was of secondary functionality and further because it contained no hindered phenol groups. HALS Control 1 is commercially available as Cyasorb UV 3346 (American Cyanamid).

"HALS Control 2" had the following structure:

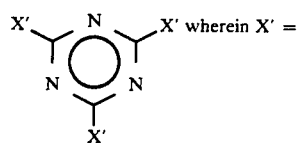 wherein X' =

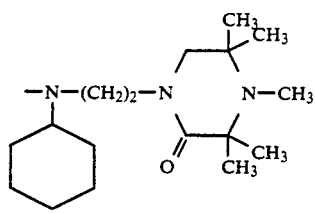

HALS Control 2 was not a Type I HALS because it did not contain a hindered phenol group.

"HALS Control 3" had the following structure:

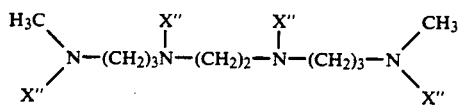

where X" = 

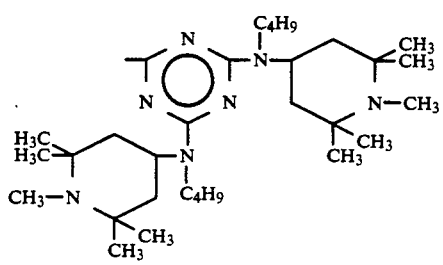

HALS Control 3 was not a Type I HALS because it contained no hindered phenol groups. HALS Control 3 is commercially available as Chimassorb 119 (Ciba Geigy).

"HALS Control 4" had the chemical name dimethyl succinate polymer with -hydroxy-2,2,6,6-tetramethyl-1-piperidineethanol and further had the following structure:

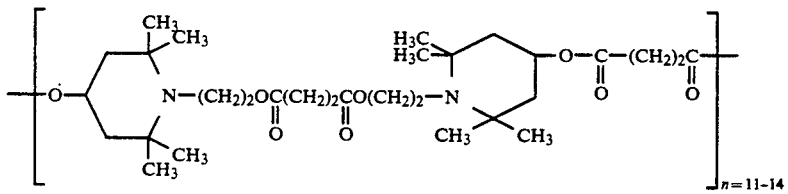

HALS Control 4 was not a Type I HALS because it did not contain a hindered phenol group. HALS Control 4 is commercially available as Tinuvin® 622 (Ciba Geigy).

"HALS Control 5" had the chemical name 1,1,-(1,3-ethanediyl)bis[3,3,5,5-tetramethylpiperazin-one] and further had the following structure:

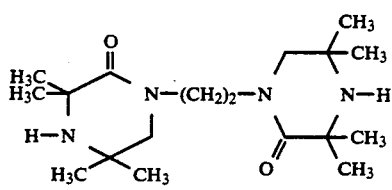

HALS Control 5 was not a Type I HALS because it did not contain a hindered phenol group and further because the hindered amine at the $N^4$ position in the piperiazinone ring was of secondary functionality. HALS Control 5 is commercially available as Good-Rite® 3034 (BF Goodrich).

"HALS Control 6" had the chemical name bis(2,2,6,6-tetramethyl-4-piperidinyl) decanediodate and further had the following structure:

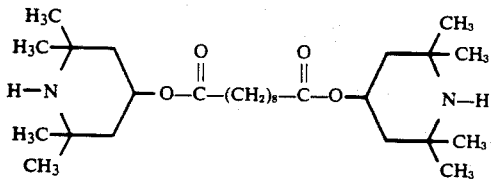

HALS Control 6 was not a Type I HALS because the hindered amine at the $N^4$ position in the piperidine ring was of secondary functionality, and further because it did not contain a hindered phenol group. HALS Control 6 is commercially available as Tinuvin® 770 (Ciba Geigy).

I(b). EXAMPLES 1-3 AND C1-C9

The components for the compositions of Examples 1-3 and C1-C9 are listed in TABLE I, below.

The composition of Example C1 was the base polyacetal homopolymer composition. The inclusion of any of HALS Control 1, HALS Control 2, or HALS Control 3, or HALS Control 4 into the base polyacetal homopolymer composition resulted in a decrease in or, at most, a maintenance of, the thermal stability of the base polyacetal composition (compare Example C1 versus Examples C2–C9). In contrast, when HALS IA was incorporated into the base polyacetal homopolymer composition, the thermal stability of the base polyacetal homopolymer composition was improved. More specifically, it took 105 minutes for 3.0 weight percent formaldehyde to evolve during the TEF test for the base polyacetal homopolymer composition (Example C1), while for compositions containing 0.10, 0.30, and 0.60 weight percent of HALS IA, which was a Type I HALS, it took 126 minutes (Example 1), 106 minutes (Example 2), and 110 minutes (Example 3), respectively, to generate 3.0 weight percent formaldehyde.

The data for "% Weight Loss After UV Exposure" showed that the UV stability of the base polyacetal homopolymer composition was improved when HALS IA was incorporated therein.

I(c). EXAMPLES 4, C1, AND C10-C12

The components for the compositions of Examples 4, C1, and C10–C12 are listed below in TABLE II. Further, the compositions of Examples 4 and C10–C12 each

TABLE I

| Example No. | Homopolymer Polyacetal (Wt. %) | CH₃ HALS (Wt. %) | Time to 3.0 Wt. % CH₂O Loss @ 259° C. (min.) | % Weight Loss After UV Exposure | | |
|---|---|---|---|---|---|---|
| | | | | 600 kJ/m2 | 1250 kJ/m2 | 2000 kJ/m2 |
| C1 | 98.35 | — | 105 | 5.32 | 10.35 | 23.63 |
| C2 | 98.25 | 0.10 Control 1 | 78 | 1.44 | 5.47 | 13.70 |
| C3 | 98.25 | 0.10 Control 2 | 95 | 0.12 | 1.12 | 3.70 |
| C4 | 98.25 | 0.10 Control 3 | 104 | 0.31 | 1.74 | 4.62 |
| 1 | 98.25 | 0.10 IA | 126 | 0.72 | 3.23 | 10.42 |
| C5 | 98.05 | 0.30 Control 1 | 59 | 0.38 | 1.11 | 1.98 |
| C6 | 98.05 | 0.30 Control 4 | 85 | 0.78 | 2.40 | 4.49 |
| C7 | 98.05 | 0.30 Control 3 | 92 | 0.50 | 2.53 | 6.36 |
| C8 | 98.05 | 0.30 Control 2 | 94 | 0.03 | 1.12 | 2.87 |
| 2 | 98.05 | 0.30 IA | 106 | 0.68 | 3.55 | 7.56 |
| C9 | 97.75 | 0.60 Control 4 | 68 | 1.60 | 3.54 | 6.94 |
| 3 | 97.75 | 0.60 IA | 110 | 0.62 | 3.25 | 8.37 | contained 0.30 weight percent of "UV absorber A", which was 2-(2H-benzotriazol-2-yl)-4,6-bis (1,1-dimethylethyl) phenol (Tinuvin® 320, Ciba Geigy).

Example C1 was the base polyacetal homopolymer composition. Examples C10–C11 showed that the inclusion of UV absorber A and HALS Control 1, or HALS Control 2, into the base polyacetal homopolymer composition resulted in a decrease in the thermal stability of said composition. In contrast, Example 4 showed that the inclusion of UV absorber A and HALS IA (which was a Type I HALS) into the base polyacetal homopolymer composition resulted in an increase in the thermal and UV stability of said composition.

TABLE II

| Example No. | Homopolymer Polyacetal (Wt. %) | HALS (Wt. %) | Time to 3.0 Wt. % CH₂O Loss @ 259° C. (min.) | % Weight Loss After UV Exposure | | |
|---|---|---|---|---|---|---|
| | | | | 600 kJ/m2 | 1250 kJ/m2 | 2000 kJ/m2 |
| C1 | 98.35 | — | 105 | 5.32 | 10.35 | 23.63 |
| C10 | 97.95 | 0.10 Control 1 | 92 | 0.00 | 0.08 | 0.34 |
| C11 | 97.95 | 0.10 Control 3 | 86 | 0.09 | 0.08 | 0.40 |
| C12 | 97.95 | 0.10 Control 2 | 108 | 0.09 | 0.06 | 0.46 |
| 4 | 97.95 | 0.10 IA | 130 | 0.04 | 0.01 | 0.55 |

I(d). EXAMPLES 5-8, C1, and C13-C20

The components for the compositions of Examples 5-8, C1, and C13–C20 are listed below in TABLE III.

The compositions of Examples 5 and C13–C16 each additionally contained 0.30 weight percent of "UV absorber B", which was 2-(2H-benzotriazol-2-yl)-4,6-bis(1-methyl-1-phenylethyl) phenol (Tinuvin® 234, Ciba Geigy). The compositions of Examples 6–7 and C17–C20 each additionally contained 0.60 weight percent of UV absorber B. The composition of Example 8 additionally contained 0.60 weight percent of UV absorber A.

The best thermal stability was obtained by polyacetal homopolymer compositions containing HALS IA, which was a Type I HALS.

TABLE III

| Example No. | Homopolymer Polyacetal (Wt. %) | HALS (Wt. %) | | Time to 3.0 Wt. % CH$_2$O Loss @ 259° C. (min.) | % Weight Loss After UV Exposure | | |
|---|---|---|---|---|---|---|---|
| | | | | | 600 kJ/m2 | 1250 kJ/m2 | 2000 kJ/m2 |
| C1 | 98.35 | — | | 105 | 5.32 | 10.35 | 23.63 |
| C13 | 97.75 | 0.30 | Control 5 | 49 | −0.09 | −0.03 | 0.12 |
| C14 | 97.75 | 0.30 | Control 1 | 61 | 0.06 | 0.30 | 0.29 |
| C15 | 97.75 | 0.30 | Control 4 | 80 | −0.09 | 0.17 | 0.29 |
| C16 | 97.75 | 0.30 | Control 3 | 92 | −0.02 | −0.06 | 0.02 |
| 5 | 97.75 | 0.30 | IA | 99 | 0.01 | −0.01 | 0.08 |
| C17 | 97.15 | 0.60 | Control 1 | 36 | 0.10 | 0.34 | 0.42 |
| C18 | 97.15 | 0.60 | Control 4 | 66 | −0.11 | 0.11 | 0.16 |
| C19 | 97.15 | 0.60 | Control 6 | 69 | 0.05 | 0.21 | 0.49 |
| C20 | 97.15 | 0.60 | Control 3 | 74 | −0.01 | −0.08 | −0.03 |
| 6 | 97.15 | 0.60 | IA | 82 | −0.13 | 0.06 | 0.13 |
| 7 | 97.15 | 0.60 | IA | 100 | −0.05 | −0.04 | 0.15 |
| 8 | 97.15 | 0.60 | IA | 94 | −0.10 | −0.01 | 0.44 |

I(e). EXAMPLES 9, C1, AND C21-C22

The components for the compositions of Example 9, C1, and C21-C22 are listed below in TABLE IV.

The compositions of Example 9 and C21-C22 each additionally contained 0.60 weight percent of UV absorber B, which was described above, and 0.50 weight percent of a carbon black-polyethylene color concentrate that contained approximately 70 weight percent carbon black.

The thermal stability of the base polyacetal homopolymer composition (i.e., Example C1) was improved when HALS IA was incorporated therein; in contrast, it was decreased when either HALS Control 1 or HALS Control 4 was incorporated therein.

TABLE IV

| Example No. | Homopolymer Polyacetal (Wt. %) | HALS (Wt. %) | | Time to 3.0 Wt. % CH$_2$O Loss @ 259° C. (min.) | % Weight Loss After UV Exposure | | |
|---|---|---|---|---|---|---|---|
| | | | | | 600 kJ/m2 | 1250 kJ/m2 | 2000 kJ/m2 |
| C1 | 98.35 | — | | 105 | 5.32 | 10.35 | 23.63 |
| C21 | 96.65 | 0.60 | Control 1 | 51 | 0.26 | 0.52 | 0.73 |
| C22 | 96.65 | 0.60 | Control 4 | 68 | 0.01 | 0.19 | 0.39 |
| 9 | 96.65 | 0.60 | IA | 111 | 0.00 | 0.19 | 0.45 |

I(f). EXAMPLES 10-11, C1, and C23-C25

The components for the compositions of Example 10-11, C1, and C23-C25 are listed below in TABLE V.

The compositions of Example 10-11 and C23-C25 each contained 0.10 weight percent of the phenolic antioxidant 4,4'-butylidene bis(6-t-butyl-3-methyl) phenol in place of 0.10 weight percent of the phenolic antioxidant Irganox® 245. Each such composition additionally contained 0.60 weight percent of UV absorber B. The compositions of Example 11 and C25 also contained 0.50 weight percent of a carbon black-polyethylene color concentrate that included approximately 70 weight percent carbon black.

Results obtained are similar to those obtained in the previous Examples.

TABLE V

| Example No. | Homopolymer Polyacetal (Wt. %) | HALS (Wt. %) | | Time to 3.0 Wt. % CH$_2$O Loss @ 259° C. (min.) | % Weight Loss After UV Exposure | | |
|---|---|---|---|---|---|---|---|
| | | | | | 600 kJ/m2 | 1250 kJ/m2 | 2000 kJ/m2 |
| C1 | 98.35 | — | | 105 | 5.32 | 10.35 | 23.63 |
| C23 | 97.15 | 0.60 | Control 1 | 44 | 0.00 | 0.16 | 0.29 |
| C24 | 97.15 | 0.60 | Control 3 | 82 | −0.13 | −0.03 | 0.02 |
| 10 | 97.15 | 0.60 | IA | 109 | −0.10 | 0.02 | 0.15 |
| C25 | 96.65 | 0.60 | Control 1 | 50 | 0.26 | 0.54 | 0.72 |
| 11 | 96.65 | 0.60 | IA | 97 | 0.03 | 0.23 | 0.56 |

I(g). EXAMPLES 12-14

The components of the compositions of Examples 12-14 are listed in TABLE VI, below. The compositions of Examples 12-14 contained neither Irganox® 245 nor Irganox® 1098. The compositions of Examples 12-14 each additionally contained 0.60 weight percent of UV absorber B. The compositions of Examples 13 and 14 further each additionally contained 0.50 weight percent a carbon black-polyethylene color concentrate that included approximately 70 weight percent carbon black. The composition of Example 14 did not contain any polyethylene glycol but did additionally contain 0.25 weight percent of N,N'-distearoylethylene diamine.

TABLE VI

| Example No. | Homopolymer Polyacetal (Wt. %) | HALS (Wt. %) | | Time to 3.0 Wt. % CH$_2$O Loss @ 259° C. (min.) | % Weight Loss After UV Exposure | | |
|---|---|---|---|---|---|---|---|
| | | | | | 600 kJ/m2 | 1250 kJ/m2 | 2000 kJ/m2 |
| C1 | 98.35 | — | | 105 | 5.32 | 10.35 | 23.63 |
| C12 | 97.30 | 0.60 | IA | 115 | −0.11 | −0.02 | 0.00 |
| C13 | 97.30 | 0.60 | IA | 101 | 0.00 | 0.14 | 0.21 |

TABLE VI-continued

| Example No. | Homopolymer Polyacetal (Wt. %) | HALS (Wt. %) | Time to 3.0 Wt. % CH2O Loss @ 259° C. (min.) | % Weight Loss After UV Exposure | | |
|---|---|---|---|---|---|---|
| | | | | 600 kJ/m2 | 1250 kJ/m2 | 2000 kJ/m2 |
| C14 | 97.30 | 0.60 IA | 89 | 0.02 | 0.15 | 0.34 |

I(h). EXAMPLES C26 and C27

Example C26

Homopolyacetal polymer, described as above and containing no additives, was subjected to the TEF test to determine the stability under melt processing conditions. It took 120 minutes for 3.0 wt. % formaldehyde to be evolved at 259° C. from this sample compositions.

Example C27

A composition containing 0.40 wt. % 2,4,6-triamino-sym-triazine and 99.60 wt. % of the same homopolyacetal polymer as in Example C26, was subjected to the TEF test, to determine the stability of the composition under melt processing conditions. It took only 15 minutes for 3.0 wt. % formaldehyde to be evolved, at 259° C., from this sample composition.

The results described above for Examples C26 and C27 showed that 2,4,6-triamino-sym-triazine severely degrades the melt processing thermal stability of homopolyacetal. Example C27, which contained 2,4,6-triamino-sym-triazine (a component found necessary in U.S. Pat. No. 4,446,263 for the UV stabilization of polyacetal copolymers) was found to reduce the melt processing thermal stability of polyacetal homopolymer by a factor of 8. Thus components effective in polyacetal copolymer are not necessarily effective in polyacetal homopolymer and in fact, cannot only be uneffective but can also be detrimental.

II. EXAMPLES 15-29

Compositions Containing Component (a) Polyacetal, Component (b) Type I HALS, and Component (c) Type II HALS

II(a). HALS Used in Examples 15-29 and C28-C39

TYPE I HALS

"HALS IA" was the same as HALS IA described above.

"HALS IB" had the chemical name 1-[2-(3,5-di-t-butyl-4-hydroxyphenyl)propionyloxy) ethyl]-4-(3,5-di-t-butyl-4-hydroxyphenyl)proprionyloxy)-2,26,6-tetramethylpiperidine. HALS IB was a HALS (b)(2) wherein R=R,=C(CH3) and Y was structure (b)(2)(a). HALS IB had the following structure:

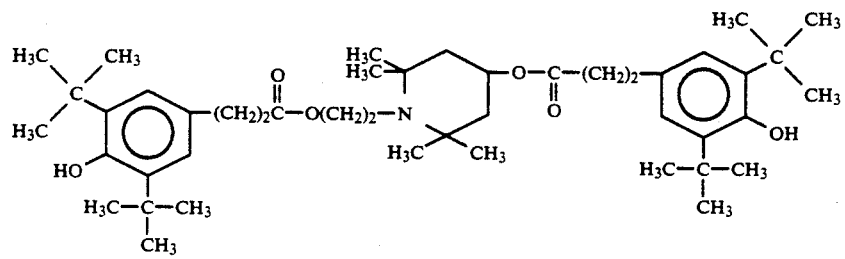

HALS IB is available commercially as Sanol LS-2626 (Sankyo)

TYPE II HALS

"HALS IIA" was the same as HALS Control 1, described above. It was a Type II HALS because it contained an s-triazine ring and a piperidine ring having a hindered amine at the N4 position. It was also the same as HALS (c)(2) wherein A was CH3.

"HALS IIB" was the same as HALS (c)(1) wherein A is CH3.

"HALS IIC" was the same as HALS (c)(3) wherein A is CH3.

Control HALS

The Control HALS used in the Examples that follow were "HALS Control 4", "HALS Control 5", and "HALS Control 6". Each such Control HALS was described above in section I of the Examples.

II(b). EXAMPLES 15-17 and C1

The components for the compositions of Examples 15-17 and C1 are listed in TABLE VII, below.

The composition of Example C1 was the base polyacetal composition. The compositions of the present invention (i.e., Examples 15-17) had better UV stability than did the base polyacetal composition.

TABLE VII

| Example No. | Polyacetal Polymer (Wt. %) | HALS (Wt. %) | Time to 3.0 Wt. % CH2O Loss @ 259° C. (min.) | % Weight Loss After UV Exposure | | |
|---|---|---|---|---|---|---|
| | | | | 600 kJ/m2 | 1250 kJ/m2 | 2000 kJ/m2 |
| C1 | 98.35 | | 105 | 5.32 | 10.35 | 23.63 |
| 15 | 98.25 | 0.05 IA<br>0.05 IIA | 86 | 0.87 | 4.05 | 12.52 |
| 16 | 98.25 | 0.05 IA<br>0.05 IIB | 124 | 0.61 | 2.63 | 8.42 |
| 17 | 98.25 | 0.05 IA<br>0.05 IIC | 129 | 0.44 | 2.66 | 8.88 |

II(c). EXAMPLES 19-21, C1, and C28-C31

The components for the compositions of Examples 19-21, C1, and C28-C31 are listed in TABLE VIII, below.

Compositions containing the HALS mixture of the present invention had better thermal stability than did compositions containing a Control HALS mixture (compare Example C28 v. 18; C29 v. 19; C30 v. 20; and C31 v. 21). Further, the UV stability of the base polyacetal composition (Example C1) was improved when the HALS mixture of the present invention was incorporated therein.

TABLE VIII

| Example No. | Polyacetal Polymer (Wt. %) | HALS (Wt. %) | Time to 3.0 Wt. % $CH_2O$ Loss @ 259° C. (min.) | % Weight Loss After UV Exposure 600 kJ/m2 | 1250 kJ/m2 | 2000 kJ/m2 |
|---|---|---|---|---|---|---|
| C1 | 98.35 | — | 105 | 5.32 | 10.35 | 23.63 |
| C28 | 97.75 | 0.30 Control 4<br>0.30 IIA | 60 | 1.11 | 5.90 | 9.78 |
| 18 | 97.75 | 0.30 IA<br>0.30 IIA | 72 | 1.70 | 5.03 | 10.92 |
| C29 | 97.75 | 0.30 Control 4<br>0.30 IIB | 70 | 0.97 | 3.75 | 7.46 |
| 19 | 97.75 | 0.30 IA<br>0.30 IIB | 97 | 0.67 | 2.62 | 5.71 |
| C30 | 97.75 | 0.50 Control 4<br>0.10 IIC | 75 | 0.62 | 2.99 | 7.67 |
| 20 | 97.75 | 0.50 IA<br>0.10 IIC | 83 | 0.71 | 3.24 | 9.40 |
| C31 | 97.75 | 0.50 Control 4<br>0.10 IIB | 67 | 0.86 | 3.23 | 6.29 |
| 21 | 97.75 | 0.50 IA<br>0.10 IIB | 106 | 0.61 | 2.86 | 6.76 |

II(d). EXAMPLES 22-24 AND C1

The components for the compositions of Examples 22-24 and C1 are listed in TABLE IX, below. The compositions of Examples 22-24 also contained 0.30 weight percent of UV absorber A, which is described above for Examples 4 and C10-C12. Addendum to be supplied.

Incorporation of the mixed HALS system of the present invention, along with UV absorber A, significantly improved the UV stability, without significantly decreasing the thermal stability, of the base polyacetal composition (Example C1).

TABLE IX

| Example No. | Polyacetal Polymer (Wt. %) | HALS (Wt. %) | Time to 3.0 Wt. % $CH_2O$ Loss @ 259° C. (min.) | % Weight Loss After UV Exposure 600 kJ/m2 | 1250 kJ/m2 | 2000 kJ/m2 |
|---|---|---|---|---|---|---|
| C1 | 98.35 | — | 105 | 5.32 | 10.35 | 23.63 |
| 22 | 97.95 | 0.05 IA<br>0.05 IIA | 97 | 0.01 | 0.05 | 0.51 |
| 23 | 97.95 | 0.05 IA<br>0.05 IIB | 103 | −0.03 | −0.06 | 0.30 |
| 24 | 97.95 | 0.05 IA<br>0.05 IIC | 105 | 0.02 | 0.00 | 0.62 |

EXAMPLES 25-28C1, AND C32-C39

The components for the compositions of Example 25-28, C1, and C32-C39 are listed below in TABLE X. The compositions of Examples 25-28 and C32-C39 additionally contained 0.60 weight percent of UV absorber B, which is described above for Examples 5 and C13-C15.

The compositions containing the mixed HALS system of the present invention had better thermal stability than did the compositions containing a Control HALS. Further, incorporation of the mixed HALS system of the present invention significantly improved the UV stability of the base polyacetal composition (Example C1).

TABLE X

| Example No. | Polyacetal Polymer (Wt. %) | HALS (Wt. %) | Time to 3.0 Wt. % $CH_2O$ Loss @ 259° C. (min.) | % Weight Loss After UV Exposure 600 kJ/m2 | 1250 kJ/m2 | 2000 kJ/m2 |
|---|---|---|---|---|---|---|
| C1 | 98.35 | — | 105 | 5.32 | 10.35 | 23.63 |
| C32 | 97.15 | 0.30 Control 4<br>0.30 IIA | 48 | 0.04 | 0.26 | 0.30 |
| 25 | 97.15 | 0.30 IA<br>0.30 IIA | 94 | 0.05 | 0.09 | 0.31 |
| C33 | 97.15 | 0.30 Control 5<br>0.30 IIB | 45 | −0.03 | 0.05 | 0.17 |
| C34 | 97.15 | 0.30 Control 4<br>0.30 IIB | 66 | −0.02 | −0.06 | −0.03 |
| C35 | 97.15 | 0.30 IA<br>0.30 IIB | 82 | −0.07 | −0.06 | 0.10 |
| 25 | 97.15 | 0.30 Control 4<br>0.30 IIB | 84 | 0.01 | 0.11 | 0.29 |
| C36 | 97.15 | 0.50 Control 4 | 63 | 0.01 | 0.04 | 0.14 |

TABLE X-continued

| Example No. | Polyacetal Polymer (Wt. %) | HALS (Wt. %) | | Time to 3.0 Wt. % CH$_2$O Loss @ 259° C. (min.) | % Weight Loss After UV Exposure | | |
|---|---|---|---|---|---|---|---|
| | | | | | 600 kJ/m2 | 1250 kJ/m2 | 2000 kJ/m2 |
| C37 | 97.15 | 0.10 | IIA | 62 | 0.00 | −0.03 | 0.04 |
| | | 0.50 | Control 4 | | | | |
| 26 | 97.15 | 0.10 | IIB | 99 | −0.07 | −0.03 | 0.15 |
| | | 0.50 | IA | | | | |
| C38 | 97.15 | 0.10 | IIB | 61 | 0.03 | 0.19 | 0.41 |
| | | 0.50 | Control 6 | | | | |
| C39 | 97.15 | 0.10 | IIC | 69 | −0.02 | −0.04 | 0.04 |
| | | 0.50 | Control 4 | | | | |
| 27 | 97.15 | 0.10 | IIC | 86 | 0.00 | −0.03 | 0.04 |
| | | 0.50 | IA | | | | |
| 28 | 97.15 | 0.10 | IIC | 93 | −0.07 | −0.05 | 0.11 |
| | | 0.50 | IA | | | | |

II(f). EXAMPLES 29-35

The components for the compositions of Examples 29-35 are listed below in TABLE XI. In addition, each composition contained 0.60 weight percent of UV absorber B, described above. The compositions of Examples 29-30 and 33 also contained 0.50 weight percent of a carbon black-polyethylene color concentrate that included about 70 weight percent carbon black.

The antioxidant system used in the compositions of Examples 31-35 was not as given above; instead, it was as listed in TABLE XII, below.

TABLE XII

| Example No. | Weight Percent Antioxidants |
|---|---|
| 31-33 | 0.10 4,4'-butylidene bis(6-t-butyl-3 methyl phenol); 0.05 Irganox ® 1098 (described above) |
| 34 | 0.05 Irganox ® 1098 (described above) |
| 35 | 0.00 |

TABLE XI provides the weight loss results for each composition after exposure to UV light for a set time period.

TABLE XI

| Example No. | Polyacetal (Wt. %) | HALS (Wt. %) | | Time to 3.0 Wt. % CH$_2$O Loss @ 259° C. (min.) | % Weight Loss After UV Exposure | | |
|---|---|---|---|---|---|---|---|
| | | | | | 600 kJ/m2 | 1250 kJ/m2 | 2000 kJ/m2 |
| C1 | 98.35 | — | | 105 | 5.32 | 10.35 | 23.63 |
| 29 | 96.65 | 0.30 | IA | 86 | 0.00 | 0.15 | 0.26 |
| | | 0.30 | IIB | | | | |
| 30 | 96.65 | 0.50 | IA | 91 | 0.02 | 0.17 | 0.36 |
| | | 0.10 | IIB | | | | |
| 31 | 97.15 | 0.30 | IA | 92 | −0.13 | −0.02 | 0.02 |
| | | 0.30 | IIB | | | | |
| 32 | 97.15 | 0.50 | IA | 79 | −0.08 | −0.02 | 0.16 |
| | | 0.10 | IIB | | | | |
| 33 | 96.65 | 0.50 | IA | 81 | 0.02 | 0.23 | 0.35 |
| | | 0.10 | IIB | | | | |
| 34 | 97.25 | 0.50 | IA | 99 | −0.09 | −0.06 | 0.05 |
| | | 0.10 | IIB | | | | |
| 35 | 97.30 | 0.50 | IA | 119 | −0.11 | −0.03 | 0.01 |
| | | 0.10 | IIB | | | | |

I claim:
1. A composition consisting essentially of:
   (a) 95.00-99.95 weight percent of a polyacetal homopolymer and
   (b) 0.05-5.00 weight percent of a hindered amine light stabilizer ("HALS") having structure HALS (b)(1) as follows:

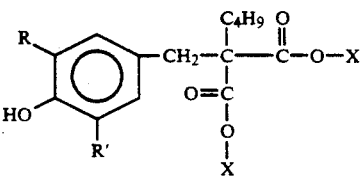

wherein X is selected from structures (b)(1)(a) and (b)(1)(b) as follows:

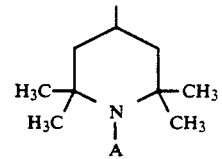

(b)(1)(a)

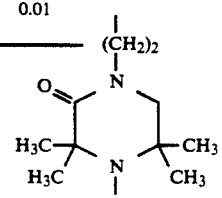

(b)(1)(b)

and wherein A is selected from C$_1$-C$_6$ alkyl, and provided that the above-stated weight percents are based upon the total of components (a) and (b) only.

2. The composition of claim 1 wherein A of HALS (b)(1) is $CH_3$.

3. The composition of claim 1 wherein A of HALS (b)(1) is $CH_3$ and $R=R'=(CH_3)_3$.

4. The composition of claim 1 wherein the component (b) HALS is HALS (b)(2), $R=R'=(CH_3)_3$, and $A=CH_3$.

5. The composition of claim 1 further comprised of at least one of antioxidants, thermal stabilizers, pigments, colorants, toughening agents, reinforcing agents, UV absorbers, nucleating agents, lubricants, glass fibers, pigments, colorants, and fillers.

6. The composition of claim 1 further comprised of at least one thermal stabilizer selected from the group consisting of nitrogen-containing polymers and hydroxy-containing polymers.

7. The composition of claim 1 further comprised of at least one hindered phenol antioxidant.

8. The composition of claim 1 further comprised of at least one UV absorber selected from the group consisting of benzotriazoles, benzophenones, oxanilides, and cyanoacrylates.

9. Shaped or molded articles made from the compositions of claim 1.

* * * * *